(12) United States Patent
Jones

(10) Patent No.: US 6,311,716 B1
(45) Date of Patent: Nov. 6, 2001

(54) FLUID FLOW DIVIDER

(75) Inventor: Kent R. Jones, Madison, AL (US)

(73) Assignee: John Blue Company, Huntsville, AL (US)

(*) Notice: Subject to any disclaimer, the term of this patent is extended or adjusted under 35 U.S.C. 154(b) by 0 days.

(21) Appl. No.: 09/655,312

(22) Filed: Sep. 5, 2000

(51) Int. Cl.[7] .................................................. G05D 11/03
(52) U.S. Cl. ..................... 137/118.02; 137/454.6
(58) Field of Search ........................... 137/118.02, 454.6, 137/513, 881

(56) References Cited

U.S. PATENT DOCUMENTS

| | | | |
|---|---|---|---|
| 2,731,976 | * 1/1956 | Orent | 137/118.02 |
| 3,412,746 | * 11/1968 | Latta | 137/118.02 |
| 5,967,179 | * 10/1999 | Kazakis et al. | 137/881 X |

* cited by examiner

Primary Examiner—Stephen M. Hepperle
(74) Attorney, Agent, or Firm—Pillsbury Winthrop LLP

(57) ABSTRACT

A flow divider, particularly for use in uniformly dividing a single incoming stream of liquid fertilizer into multiple outlet streams. The flow divider features a housing having a bore therein; a distribution sleeve which fits within the bore; and a distribution needle which slides within the distribution sleeve to evenly divide the incoming flow. Flow enters a distribution chamber formed between a tip portion of the distribution needle and the distribution sleeve, preferably flowing over a series of circumferential ribs located on the tip portion, and accelerates through a narrowing, flow-accelerating region between the distribution needle and the distribution sleeve. The flow is then discharged through a series of orifices in the distribution sleeve and out through a series of flow passageways radially arranged around the flow divider. When fluid flow supply is terminated, no pressure is developed and the distribution needle automatically returns to a closed position in which the inlet orifice in the distribution sleeve is closed by the tip portion of the distribution needle, and the outlet flow orifices in the distribution sleeve are closed by means of the body portion of the distribution needle.

14 Claims, 2 Drawing Sheets

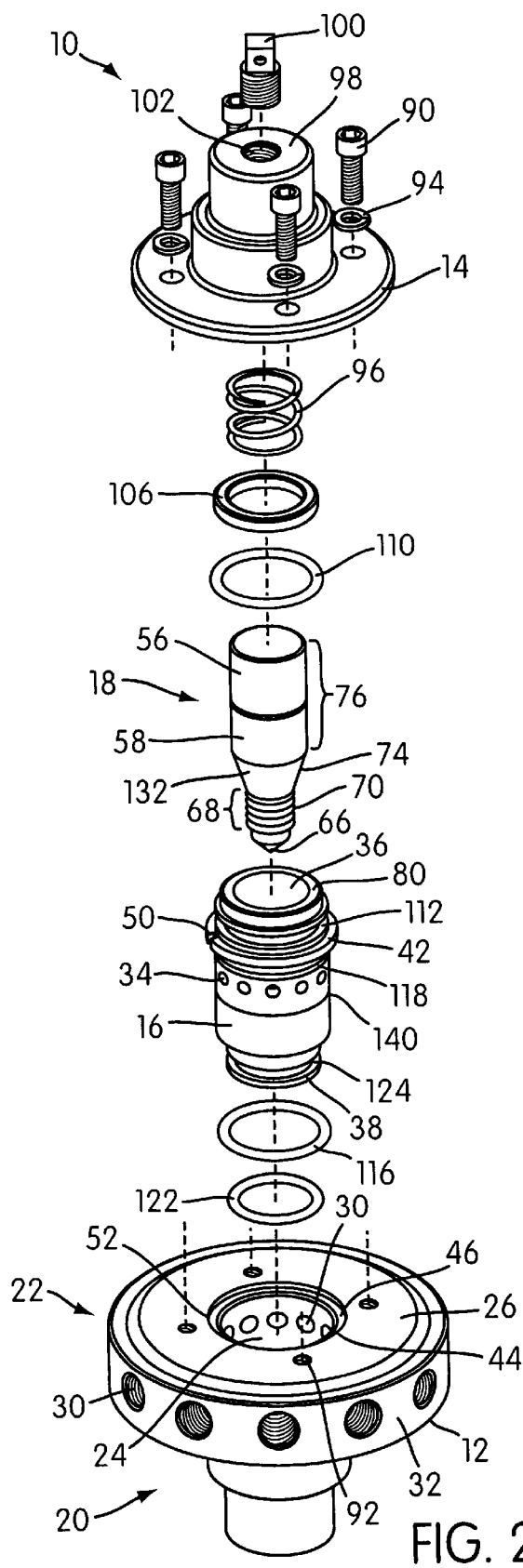
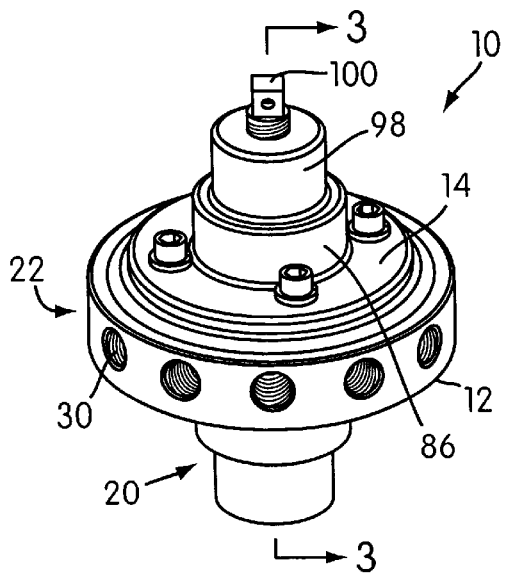
FIG. 1
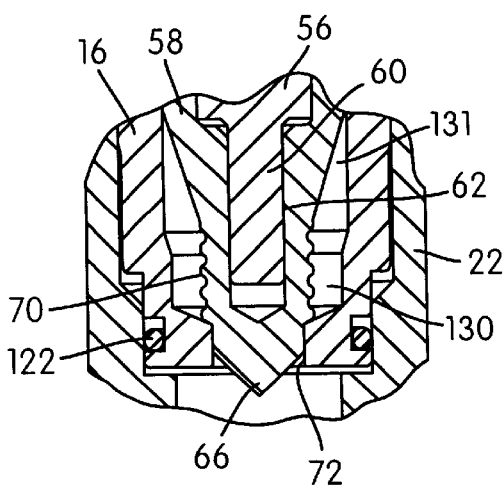
FIG. 4
FIG. 2

FLUID FLOW DIVIDER

FIELD OF THE INVENTION

The invention relates to fluid flow dividers or distributors and, in particular, to a fluid flow divider for use with liquid agricultural fertilizer.

BACKGROUND OF THE INVENTION

In large-scale agricultural production (i.e., farming), it is common practice to fertilize the soil with a liquid fertilizer.

Often, this is done using a knife or disc opener on an applicator or planter, as well known in the art, with a plurality of distribution lines from the flow divider—preferably one associated with each knife or disc opener—used to distribute the liquid fertilizer. A supply of the liquid fertilizer typically is contained in a large tank which is supported on or pulled by the agricultural machinery, and the liquid fertilizer is pumped from the supply tank through a conduit to a flow divider distributor which divides the flow of fertilizer into a plurality of streams, with one stream flowing to each point of placement behind the knife or disc opener.

In general, it is important for the flow of fertilizer to be divided uniformly among the several flow streams. Otherwise, some areas of the ground will receive more fertilizer than is required or can be used (hence wasting fertilizer) and other areas will receive less fertilizer than required (hence causing poor crop growth in those areas).

Previously, it has been known to use a standard "manifold" system to distribute the liquid fertilizer. Such a manifold system has a single inlet and multiple outlet ports receiving flow from a central manifold plenum or chamber. In order for such a manifold system to distribute flow accurately, an appropriately sized orifice is provided in the flow path of each outlet port, thereby creating a minimum pressure and promoting even distribution between the various ports. Unfortunately, these orifices typically are each sized for a specific, generally narrow flow range. Therefore, variation in fertilizer flow rate, e.g., due to variation in application speed or rate, requires the operator to suspend the fertilizer application and manually change the external orifices to match the new required flow rate. Furthermore, these orifices are subject to clogging.

Alternatively, automatically adjusting flow dividers, which operate over a wider range of fertilizer flow rates, have also been used. These previously known, automatically adjusting flow dividers utilize separate needle valves each regulating the flow through a respective exit flow port, and each needing to be calibrated independently. All of the valve needles are linked to a central rod; the central rod, in turn, is held against a spring and diaphragm to control its axial movement and hence the axial positioning of each of the individual port needles. This design has proven to be somewhat cumbersome, and therefore inefficient because the relatively large number of parts and the required calibration of each of those parts increases the cost of the divider and decreases its serviceability—particularly when in the field.

BRIEF SUMMARY OF THE INVENTION

The present invention provides an automatically adjusting flow divider which avoids these limitations of the prior art.

A flow divider according to the invention is composed basically of: a housing having a central bore, an inlet port for receiving the input stream of fluid, the inlet port selectively being in fluid communication with the central bore, and a plurality of radially oriented outlet passageways spaced equiangularly around the central bore; and a distribution needle which slides coaxially within the central bore, is biased toward a closed position in which the distribution needle interrupts communication between the inlet port and the central bore and communication between the central bore and the outlet passageways, and, in response to fluid pressure at the inlet port, slides axially in the bore so as to open fluid communication between the inlet port and the central bore and fluid communication between the central bore and the outlet passageways, whereby fluid is distributed generally uniformly to provide the plurality of separate output streams.

BRIEF DESCRIPTION OF THE SEVERAL VIEWS OF THE DRAWING

The invention will now be described in greater detail in connection with the drawings, in which:

FIG. 1 is a perspective view of a flow divider according to the invention;

FIG. 2 is an assembly view of the flow divider shown in FIG. 1;

FIG. 4 is a cross-sectional view to a larger scale showing the circled portion of FIG. 3.

DETAILED DESCRIPTION OF THE INVENTION

Figure 3:
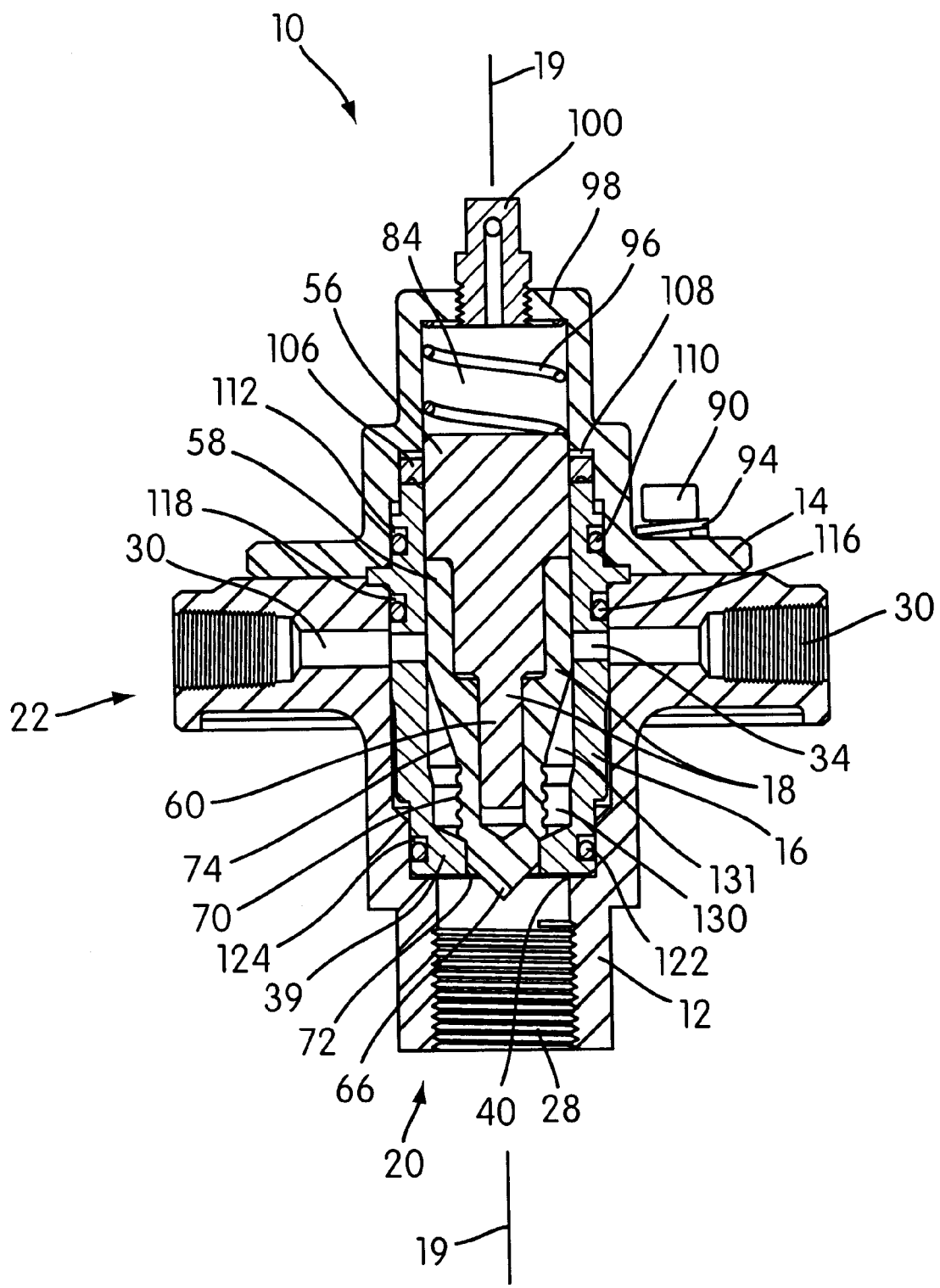
FIG. 3 is a section view of the flow divider of the invention taken along lines 3—3 in FIG. 1 with no fluid flow through it.

A flow divider 10 according to the invention is shown in FIGS. 1–3. The flow divider includes a two-piece housing constructed from 316 stainless steel or other suitable corrosion resisting material and consisting of a lower, distribution unit 12 and a cap member 14; a removable, universal distribution sleeve 16 constructed from 316 stainless steel or other suitable corrosion resistant material; and a preferably two-component distribution needle 18, constructed as described in more detail below. The flow divider 10 according to the invention preferably is axially symmetric and formed as a body of revolution, e.g., round in cross-section anywhere along the central axis 19 (FIG. 3).

The distribution unit 12 has a stem-like, unitary inlet portion 20 and a wheel-like outlet portion 22. A central bore 24 extends from cap member seating surface 26 through both the outlet portion 22 and the inlet portion 20 and is configured to receive the universal distribution sleeve 16 therein, as described in greater detail below. The central bore 24 extends all the way through the stem-like inlet portion 20 so as to provide a single inlet port 28 at the end thereof, which inlet port 28 preferably is threaded—either internally as shown or externally—so as to connect a conduit (not shown) between the flow divider and a pump which draws liquid fertilizer from a supply tank. A plurality of radially oriented outlet passageways 30 extend all the way from the central bore 24 through the outlet portion 22 of the distribution unit 12 to the exterior surface 32 thereof, with the longitudinal axes arranged perpendicular to axis 14. The outlet passageways 30 preferably are internally threaded at their outermost ends such that the individual delivery conduits (not shown) can be connected to the flow divider.

The outlet ends of the delivery conduits may be connected to row knives or may be positioned behind a disc opener for fertilizer placement in a row without requiring use of any orifice devices. Outlet portion 22 of distribution unit 12 may be provided with between 2 and 20 passageways 30, models presently under development being provided with either 12 or 20 passageways.

Removable universal distribution sleeve 16 is a generally tubular member which fits coaxially within the central bore 24. Distribution sleeve 16 has an end wall 39 and a side wall (not separately numbered) provided with a plurality of outlet flow orifices 34 extending radially through the side wall of the sleeve so as to provide fluid communication between the cavity 36 of the sleeve and the exterior of the sleeve. The outlet flow orifices 34 are axially or longitudinally positioned along the distribution sleeve 16 such that when the sleeve is inserted completely into the central bore 24 (at which point the bottom end 38 of the sleeve will abut internal shoulder 40 formed within the bore 24), the outlet flow orifices 34 will be aligned with the outlet passageways 30 extending through the outlet portion 22 of the distribution unit 12.

If it is desired to distribute liquid to fewer than all outlet passageways 30, a selected number of those passageways can be blocked by screwing a plug into their outlet ends. Preferably, the passageways to be left open, or the passageways to be plugged, are selected to be uniformly distributed around central axis 19. For example, if outlet portion 22 has twelve passageways 30 and eight passageways are to be used, every third passageway would be plugged.

As shown most clearly in FIG. 2, sleeve 16 has an outer diameter which is reduced slightly over a region below a line 140. This diameter reduction minimizes the length of the close tolerance fit between sleeve 16 and central bore 24 that prevents fluid from flowing between outlet passageways 30.

A seating flange 42 extends circumferentially around the distribution sleeve 16 near the upper portion thereof and sits within a slightly enlarged, "counterbored" portion 44 formed at the upper end of the central bore 24, against a shoulder surface 46 of outlet portion 22. This feature, in connection with the abutment of the bottom end 38 of the distribution sleeve 16 against the internal shoulder 40, properly positions sleeve 16 longitudinally or axially within the central bore 24. Furthermore, a small notch 50 formed in the seating flange 42 registers with a small rib 52 extending from the shoulder surface 46 so as to ensure proper angular or rotational positioning of the distribution sleeve 16 within the distribution unit 12.

Distribution needle 18 fits within the cavity 36 of the distribution sleeve 16 and is sized so as to be able to slide axially within the cavity. As noted above, the distribution needle 18 preferably has a two-component design. In particular, the distribution needle 18 has a core needle body member 56 and a sheath-like needle tip member 58, which is press-fitted onto a needle body extension 60 and securely held thereon, e.g., by small barbs 62 as shown in FIG. 4. Preferably, needle body member 56 is made from 316 stainless steel or other suitable corrosion resistant material, and the needle tip member 58 is made capable of providing a suitable sealing surface with radial seal 106, to be described below, from corrosion resistant material such as PFTE, nylon, polypropylene, etc. having good corrosion resistance and a low coefficient of friction. The benefit derived from constructing the distribution needle from two different components is that the material of body member 56 is resistant to wear and corrosion, thereby assuring accurate positioning of needle 18, and the material of needle tip member 58 minimizes friction between distribution needle 18 and sleeve 16 (described below) or other bearing surfaces (such as between the tip portion of the distribution needle and the needle-receiving inlet flow orifice 72, as described below). This, in turn, enhances smooth, accurate axial positioning of the distribution needle within the assembly.

The lowermost end 66 of the tip portion 68 of distribution needle 18 (i.e., the lowermost end of the needle tip member 58) is conically shaped, and the remainder of the tip portion is generally cylindrically shaped. The distribution needle 18 has a series of ribs 70 extending circumferentially around approximately the upper two-thirds of the tip portion 68, while approximately the lower one-third of the tip portion 68 is smooth-walled so as to fit through and slide easily within needle-receiving inlet flow orifice 72 formed in the end wall 39 of the distribution sleeve 16. The number of ribs 70 may be between four and six and would depend on needle length.

The distribution needle 18 increases in diameter over the length of the frustroconical, flow-accelerating, throat-forming portion 74 to have essentially the same diameter as the cavity 36, i.e., so that a cylindrical body portion 76 formed partly by body member 56 and partly by needle tip member 58 makes sliding engagement along its length and its periphery with the walls of the cavity 36.

Ribs 70 create a spiraling turbulence in the liquid flow to help distribute the liquid uniformly to the outlet passageways 30, while the tapered port above ribs 70 converts the turbulent flow to a laminar flow.

As shown most clearly in FIG. 3, the distribution needle 18, and more specifically needle body portion 76, extends axially or longitudinally beyond the upper surface 80 of distribution sleeve 16. Cap member 14 is configured to fit down over the portion of the sleeve/needle assembly extending above the cap member seating surface 26 of outlet portion 22, and cap member 14 is provided with a bore 84 having a diameter through lower portion 86 of the cap member that is approximately the same as the outer diameter of distribution sleeve 16 and a diameter through upper portion 88 of the cap member that is approximately the same as the outer diameter of the body portion 76 of the distribution needle. The cap member 14 fits over the distribution needle/distribution sleeve assembly, as shown most clearly in FIGS. 3 and 4, and is secured against cap member seating surface 26 using, e.g., bolts 90, which are screwed into corresponding bolt holes 92, and lock washers 94. As noted above, the distribution sleeve 16 is removable, and configuring the cap member as a removable item (with the distribution sleeve being securely positioned and held within that portion of the central bore that extends through the distribution unit 12) permits easy servicing of all components of the flow divider (e.g., to change to a differently configured distribution sleeve) without needing to remove or disconnect the flow divider from the various inlet or outlet conduits.

Compression spring 96 is disposed within the cap bore 84 and bears against end wall 98 of the cap member so as to bias the distributor needle downward against the end wall 39 of the distribution sleeve, with the lowermost one of the circumferential ribs 70 bearing against the inner surface of the end wall 39 of the distribution sleeve so as to limit downward movement of the distribution needle. The stiffness of spring 96 (i.e., the spring constant) is based upon the fluid pressure to which the needle assembly will be subjected in operation.

Vent plug 100 is screwed into threaded aperture 102 formed in end wall 98 of cap member 14. The vent plug 100 allows air to enter and be expelled from the cavity formed within the cap member (i.e., the cap bore 84) as distribution needle 18 reciprocates within the bore, thereby permitting free sliding movement of the needle while at the same time keeping environmental debris (e.g., dust) out of the flow divider and preventing contamination.

If the flow divider is used for distributing certain types of liquid, such as anhydrous ammonia, vent plug 100 may usefully be replaced by a conduit which would, in the event of seal failure, transport liquid which escapes past the seal to a safe location for containment or re-use.

Finally, with respect to the construction of the flow divider 10 according to the invention, a number of seals are provided for proper leak-proof operation. (The seals also help stabilize the position of the distribution sleeve within the assembly.) In particular, a circumferential seal 106 surrounds the upper portion of the body portion 76 of the distribution needle and is positioned so as to sit against the upper surface 80 of the distribution sleeve 16. It is radially bounded by the wall of the cap bore 84, and it is longitudinally or axially restrained against the upper surface 80 of the distribution sleeve by means of circumferential shoulder surface 108 formed in the cap member 14.

Seal 106 may be a component referred to as a "V" packing, one form of which is marketed under the name Polyseal™. The "V" packing is oriented so that the open end of the V is exposed to the pressure region to be sealed. Therefore, as pressure increases, the V opens to form a tighter seal. This expansion also imposes a greater resistance to movement on needle 18. However, expansion occurs at higher pressure levels which allow the increased frictional resistance to be overcome. Such a "V" packing provides greater stability than a conventional O-ring. Seal 106 may be made of a material comparable to Viton®, which offers a good combination of chemical compatibility, coefficient of drag and sealing qualities. For distribution of certain liquids, a material such as Buna-N may be preferable. A seal made of one the materials mentioned above forms a relatively corrosion-resistant seal against the distributor needle while allowing it to move axially substantially without impediment due to the low level of friction between the material from which the lip seal is made and the material (316 stainless steel) from which the needle body member 56 is made.

O-ring seal 110 fits within circumferential groove 112 formed on the outer surface of the distribution sleeve 16, near the upper end thereof, and forms a seal between the upper end of the distribution sleeve and the interior surface of the cap member. Similarly, O-ring seal 116 fits within circumferential groove 118 formed in the exterior surface of the distribution sleeve 16 and forms a seal between the distribution sleeve 16 and the outlet portion of the distribution unit 12, above the outlet passageways 30; and O-ring seal 122 fits within circumferential groove 124 formed in the outer surface of the distribution sleeve 16 near the bottom end 38 and forms a seal between the lower end of the distribution sleeve and the interior surface of the inlet portion of the distribution unit. The O-ring seals may be made of the same materials as seal 106.

The seal 106 prevents liquid fertilizer flowing through the flow divider (as described in greater detail below) from flowing between the distribution needle and the distribution sleeve and leaking out of the top of the flow divider. The O-ring seal 116, along with O-ring seal 110, prevents fluid from leaking from the flow passageways 30 along the exterior of the distribution sleeve 16 and out of the flow divider through the cap member. O-ring seal 122 prevents fluid being introduced into the flow divider through inlet port 28 from bypassing the needle/sleeve assembly and flowing along the exterior of the distribution sleeve, into the outlet passageways 30 without being regulated.

The flow divider according to the invention automatically provides four process stages to distribute the flow of fertilizer substantially equally to all distribution ports. In particular, as liquid fertilizer (or other fluid which the flow divider might be used to distribute) is pumped into the flow divider through the inlet port, the distribution needle is forced to rise within the distribution sleeve against the biasing force of the compression spring such that an annular, flow-through gap is formed between the conical, lowermost end 66 of the distribution needle 18 and needle-receiving inlet flow orifice 72 formed in the bottom end of the distribution sleeve, as shown in FIG. 4. As the distribution needle rises within the distribution sleeve and the annular flow-through gap opens, the liquid fertilizer flows over the axially symmetric, conical surface of the lowermost end 66 of the distribution needle. The axial symmetry promotes uniform circumferential distribution of the flow past the tip portion 68 of the distribution needle.

As the fertilizer (or other fluid) enters the flow distribution chamber 130 defined between the lower portion of the outer surface of the distribution needle and the walls of the cavity 36 of the distribution sleeve 16, it flows over the series of circumferential ribs 70. This further helps to distribute the fluid uniformly around the flow distribution chamber and helps to eliminate non-uniformity in the fluid flow which results from the initial distribution around the conical lowermost end 66 of the distribution needle as the fluid enters the flow distribution chamber 130.

As the distribution needle rises within the distribution sleeve, the juncture edge 132 between the cylindrical body portion 76 and the conical surface of the throat-forming portion 74 moves at least partially past the outlet flow orifices 34 in the wall of the distribution sleeve, thereby at least partially opening the outlet flow orifices 34 so as to permit fluid flow through them. As the fluid flows beyond the flow distribution chamber 130, it is caused to accelerate in a flow-accelerating region 131 by virtue of the narrowing of the flow passageway, which narrowing is attributable to the outward taper (from bottom to top) of the throat-forming portion of the distribution needle is constructed to prevent liquid separation from the walls delimiting the flow passageway and greater control at the variable orifice outlets.

The flow area associated with each outlet passageway 30 increases abruptly at the inlet end of each outlet flow orifice 34. The narrowing passage which defines flow-accelerating region 131 constitutes a venturi which combines with each outlet passageway for form a flow nozzle. At the outlet side of each flow nozzle, i.e., in each orifice 34, there is a sudden pressure drop due to the increased flow area, offset by the pressure developed in chamber 130.

Device 10 functions in the manner of an orifice meter and has an automatic self-equalizing operation in that the pressure within chamber 130 is balanced against the return force of spring 96. Therefore, as the rate at which liquid is delivered to chamber 130 increases, the pressure in chamber 130 increases and needle 18 is displaced to increase the area of the narrowest point in each liquid flow path.

Because of this adjustment in the area at the narrowest point in each flow path, the flow resistance within device 10 decreases with increasing flow rate. As a result, the outlet pressure experienced by the pump increases at a relatively low rate as flow rate increases. In contrast, with a fixed flow resistance, pump outlet pressure would increase at a higher rate, as a quadratic function of flow rate. In the case of a positive displacement pump, the results would be that the outlet pressure would reach the limit of the pump after only a small change in flow rate.

This four-stage process occurs automatically as a result of the design of the flow divider of the invention and results in highly evenly distributed flow from the single inlet to the multiple outlets.

Preferably, the flow divider is supplied from a positive displacement pump having a variable pumping rate. As liquid is pumped, the resulting pressure displaces distribution needle through a distance which varies with the flow rate. Therefore, the cross section of the passage at each flow orifice 34 increases with flow rate. As a result, the pressure as seen at the pump outlet increases more gradually and the pumping rate can be varied over a wider range than a distribution having outlet passages of fixed cross section. Thus, uniform flow distribution is maintained across a relatively wide range of fertilizer application rates (as compared to prior art, orifice-based systems), and such variation in fertilizer application rates will promote self-equalizing adjustments, with minimal change in system pressure, within flow divider 10 to accommodate changes in application, or flow, rate.

When the supply pressure drops to zero (i.e., when the supply pump is stopped), the compression spring 96 forces the distribution needle back to its original, closed position, with the tip portion of the distribution needle closing off the needle-receiving inlet flow orifice 72 and the juncture edge 132 sliding back past the outlet flow orifices 34 such that they are covered by the body portion of the distribution needle and flow through the divider is sealed off, preventing back flow siphoning between passageways 30.

It will occur to those having skill in the art that other configurations and embodiments beyond those shown in the preceding disclosure are possible. For example, although the flow divider 10 is shown as being axially symmetric with all components having round cross-sections, i.e., the flow divider is formed as a body of revolution, the components do not need to be so limited in their configuration. For example, a square bore, sleeve, and pin configuration are envisioned. Such modifications to and departures from the embodiments described above are deemed to be within the scope of the following claims.

I claim:

1. A flow divider for uniformly distributing a single input stream of fluid into a plurality of separate output streams, said flow divider comprising:
   a housing having a central bore, an inlet port for receiving the input stream of fluid, said inlet port selectively being in fluid communication with said central bore, and a plurality of radially oriented outlet passageways spaced around said central bore, said outlet passageways selectively being in fluid communication with said central bore so as to permit fluid flow from said central bore to the exterior of said housing; and
   a distribution needle which slides coaxially within said central bore;
   wherein said distribution needle is biased toward a closed position in which said distribution needle interrupts communication between said inlet port and said outlet passageways;
   wherein, in response to fluid flow inducing a pressure being applied against an end of said distribution needle, said distribution needle slides axially in said bore so as to open fluid communication between said inlet port and said outlet passageways, whereby fluid flows into said flow divider and is distributed generally uniformly to provide said plurality of separate output streams; and
   wherein said distribution needle is configured to form, between said inlet port and each said outlet passageway, a flow path portion having a cross-sectional area that varies as a function of the extent of displacement of said needle from the closed portion.

2. The flow divider of claim 1, further comprising a distribution sleeve disposed coaxially within said central bore, said distribution sleeve having an end wall and a side wall which define a cavity, said end wall having an inlet flow orifice extending therethrough and said side wall having a plurality of equiangularly spaced outlet flow orifices extending therethrough, each of said outlet passageways being axially aligned with a respective flow orifice,
   wherein said distribution needle is disposed in and slides axially within said cavity and has an end that sealingly fits within said inlet flow orifice and a body portion that blocks said outlet flow orifices when said distribution needle is in said closed position; and said end of said distribution needle moves at least partially out of said inlet flow orifice and said body portion moves past said outlet flow orifices so as to at least partially unblock said outlet flow orifices when fluid pressure is applied against said end of said distribution needle so as to permit fluid to flow into said cavity through said inlet flow orifice, alongside said distribution needle, and out of said cavity through said outlet flow orifices.

3. The flow divider of claim 1, wherein said distribution needle has a tip portion having a first cross-sectional area and a body portion having a second, larger cross-sectional area, said distribution needle further having a flow-accelerating, throat-forming portion disposed between and joining said tip portion to said body portion, said throat-forming portion tapering from a third cross-sectional area where said throat-forming portion joins said tip portion, that is equal to said first cross-sectional area to a fourth cross-sectional area, where said throat-forming portion joins said body portion, that is equal to said second cross-sectional area.

4. The flow divider of claim 1, further comprising a distribution sleeve disposed coaxially within said central bore, said distribution sleeve having an end wall and side wall which define a cavity, said end wall having an inlet flow orifice extending therethrough and said side wall having a plurality of equiangularly spaced outlet flow orifices extending therethrough, each of said outlet passageways flow being axially aligned with a respective flow orifice,
   wherein said distribution needle has a tip portion having a first cross-sectional area and a body portion having a second, larger cross-sectional area, said distribution needle further having a flow-accelerating, throat-forming portion disposed between and joining said tip portion to said body portion, said throat-forming portion tapering from a third cross-sectional area where said throat-forming portion joins said tip portion, that is equal to said first cross-sectional area to a fourth cross-sectional area where said throat-forming portion joins said body portion, that is equal to said second cross-sectional area; and
   wherein said distribution needle is disposed in and slides axially within said cavity; the tip portion of said distribution needle sealingly fits within said inlet flow orifice and the body portion of said distribution needle blocks said outlet flow orifices when said distribution needle is in said closed position; and the tip portion moves at least partially out of said inlet flow orifice and the body portion moves past said outlet flow orifices so as to at least partially unblock said outlet flow orifices when fluid pressure is applied against the tip portion of said distribution needle so as to permit fluid to flow into said cavity through said inlet flow orifice, alongside said distribution needle, and out of said cavity through said outlet flow orifices.

5. The flow divider of claim 4, wherein a flow distribution chamber is defined between the tip portion of said distribution needle and a portion of the side wall of said distribution sleeve.

6. The flow divider of claim 4, wherein a flow-accelerating region is defined between the throat portion of said distribution needle and a portion of the side wall of said distribution sleeve.

7. The flow divider of claim 1, wherein a tip portion of said distribution needle has at least one circumferential rib disposed thereon.

8. The flow divider of claim 1, wherein said housing comprises: a distribution unit having an inlet portion with said inlet port for receiving the input stream of fluid and an outlet portion with said radially oriented outlet passageways; and a cap member removably connected to said distribution unit.

9. The flow divider of claim 8, wherein said central bore is formed partially within said inlet portion and extends into said cap member.

10. The flow divider of claim 1, further comprising a circumferential V-seal member disposed around the body portion of said distribution needle and in contact with walls of said central bore.

11. The flow divider of claim 2, further comprising one or more o-ring seals disposed between said distribution sleeve and walls of said central bore.

12. The flow divider of claim 1, wherein said distribution needle comprises a needle tip member and a distinct needle body member.

13. The flow divider of claim 12, wherein said needle tip member is sheath-like and is attached to a needle body extension extending from said needle body member.

14. The flow divider of claim 12, wherein said needle tip member and said needle body member are made from different materials.

* * * * *